Jan. 14, 1941.    R. C. SANDERS, JR    2,228,367
FREQUENCY METER
Filed Dec. 30, 1938

Inventor
Royden C. Sanders Jr.
By
Attorney

Patented Jan. 14, 1941

2,228,367

UNITED STATES PATENT OFFICE 2,228,367

FREQUENCY METER

Royden C. Sanders, Jr., Audubon, N. J., assignor to Radio Corporation of America, a corporation of Delaware Application December 30, 1938, Serial No. 248,577

4 Claims. (Cl. 172—245)

This invention relates to direct reading electronic frequency meters which are independent of the applied voltage if a certain minimum voltage is exceeded, and has for its primary purpose the provision of a simplified system for indicating frequencies and especially a system characterized by its economy of parts and its adaptability to uses in which minimum weight and space are prime factors.

Another object of this invention is to provide a frequency indicator which is reliable and accurate within a wide range of frequencies. Another object is to provide a simplified frequency indicator which is adapted for use in conjunction with a radio receiver, or any source of voltage whose frequency is to be measured, the indicator operating without placing any additional drain on the power supply system of the receiver.

In accordance with this invention, a voltage of alternating potential whose frequency is to be measured is applied across the electrodes of a neon or similar gaseous discharge tube and also across a serially connected capacitor, meter and rectifier. A second rectifier for passing current in the opposite direction is connected across the first rectifier and meter. Charging currents in one direction therefore pass through the meter. The amplitudes of the successive applied impulses are maintained at a constant value by the neon tube and the duration of successive impulses is made constant by the differentiating action of the capacitor, so that the deflection is proportional to frequency.

This invention will be better understood from the following description when considered in connection with the accompanying drawing. Its scope is indicated by the appended claims.

Figure 1:
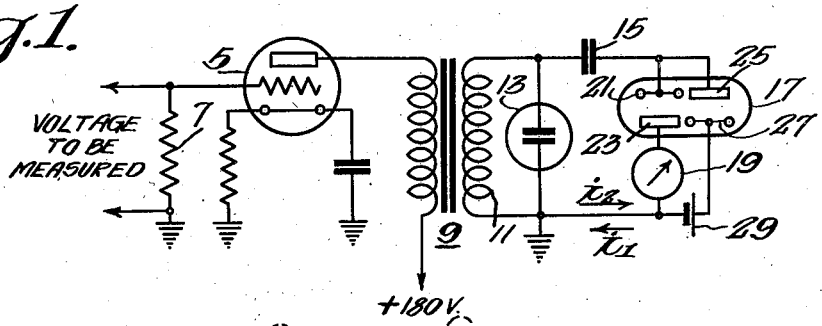
Figure 2:
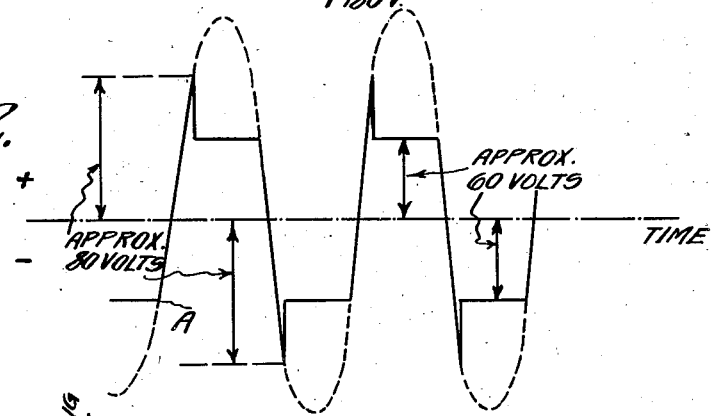
Figure 3:
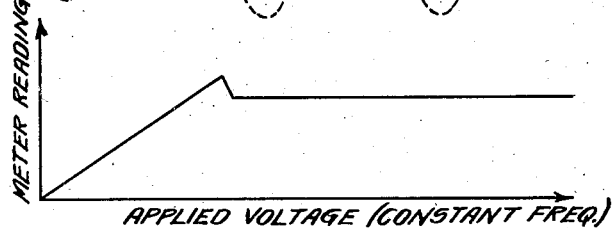
Figure 4:
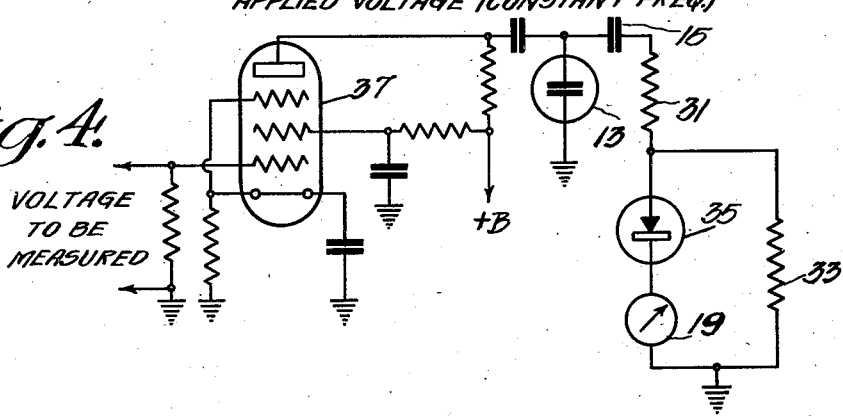

Referring to the drawing, Figure 1 is a circuit diagram of a preferred embodiment of my invention; Figures 2 and 3 are curves explaining the operation of the invention; and Figure 4 is a schematic diagram of a modification of this invention.

Referring to Fig. 1, an amplifier tube 5 is shown which may be the output tube of a receiver, or which may be connected to any source of voltage whose frequency is to be measured. The input voltage is applied across the resistor 7. The output of the amplifier 5 is connected to an output transformer 9, having a high impedance secondary winding 11. The amplifier and transformer are preferably so designed that at least 100 volts is obtained across the secondary 11. In certain instances, it is evident that the amplifier may be entirely omitted.

A neon tube 13 is connected across the terminals of the secondary winding 11. This tube may be any commercially available neon tube, such as the well known ¼ watt glow tube. Such a tube will become ionized and begin to arc between its electrodes when the voltage applied to it exceeds a value of the order of 80 volts. After the break down voltage has been reached, the tube thereafter maintains the voltage at approximately 60 volts. This voltage will be maintained until such time as the applied voltage drops below 60 volts, at which time the arc discharge will be extinguished. It is to be noted that the arc discharge takes place regardless of the polarity of the applied voltage.

This action is illustrated in Fig. 2, to which reference is now made. The voltage across the tube rises to approximately 80 volts, as shown, at which point the tube break down begins, and the voltage is suddenly reduced to a constant value of approximately 60 volts. When the applied voltage becomes less than 60 volts, the tube is extinguished. The same cycle is repeated for the negative half of the cycle. The dotted portion of Fig. 2 shows the original audio voltage before it was limited by the neon tube. The result is that when the applied voltage is above a certain minimum value, a series of impulses of constant amplitude, but whose duration is a function of the frequency of the applied voltage, are produced across the terminals of the neon tube 13 such as shown in Fig. 2.

A capacitor 15, one pair of electrodes 21, 23 of a double diode rectifier 17, and a direct current meter 19 are serially connected across the terminals of the neon tube 13. The remaining pair of electrodes 25, 27 of the double diode 17 are connected across the meter and the first diode through a small biasing battery 29. The diode rectifiers are connected so that current will flow through them in opposite directions. Consequently the meter 19 responds to current impulses flowing in a given direction while the impulses flowing in the opposite direction are shunted around the meter.

The operation of this embodiment of my invention will now be explained. Assume that the first impulse creates a potential across the secondary 11 which is negative with respect to ground, that the neon tube has limited its amplitude, and that the potential is about to pass the point A of Fig. 2. The sudden increase of voltage to a positive value causes a charging current $i_1$ to flow between the diode electrodes 25, 27. The total current required to charge the capacitor 15 is proportional to its capacity C and the amplitude E of the applied voltage, as is well known. The time required for the charge to be completed is a function of the time constant of the circuit, which in turn is determined by the capacity C and the resistance R through which the current must flow. In this instance the resistance R consists of the rectifier resistance. Having completed the charge, nothing further happens until the potential across the tube changes. Thus it may be seen that the charging current is independent of the duration of the impulse represented by the flat portion of the first impulse of Fig. 2, if the time constant of the circuit is small enough.

When the potential of the applied voltage reverses a charging voltage of 120 volts is again impressed across the condenser; that is, there is a change from +60 to −60, neglecting the effect of the downward 80 volt peak which is of very short duration. A charging current now flows in the opposite direction, through diodes 21, 23 and the meter 19, causing a deflecting kick to be exerted on the meter mechanism. Subsequent reversals take place for each half cycle of the applied voltage. Alternate impulses are passed through the meter and are of constant amplitude and of constant duration. The actual deflection of the meter is, therefore, a function of the average current, and thus is directly proportional to frequency.

The effect of the 80 volt peak which occurs just prior to the institution of the limiting action of the tube 13 depends upon the time constant of the capacity-resistance circuit. If the duration of this peak is small with respect to the time constant of the system its effect will be negligible, since substantially no charging current will flow during this brief interval. It is, of course, necessary that the time constant of the circuit be such that the condenser becomes fully charged by the time the polarity of the applied potential reverses, and this for the highest frequency which is to be indicated. Within this limitation the time constant of the circuit does not affect the reading of the meter since each impulse contains a constant amount of energy equal to 2EC.

The purpose of battery 29 is to provide a negative bias to prevent the no signal diode current which would normally flow through the meter 19 in the absence of an applied voltage. This battery may be a very small 1½ volt cell or the like. It is to be noted that the only other source of power necessary in this arrangement is a filament supply, which has not been illustrated, for the diode rectifiers. The amplifier 5 is not necessary where the frequency meter is used in conjunction with systems capable of supplying a high enough voltage. This is usually the case where the device is to be used with a radio receiver. It is also to be understood that the two diodes may be combined in the amplifier tube, or one diode may be replaced by a resistor, in which case the device adds no burden to the existing power supply system. This is an important feature of my invention when it is to be used in aircraft where the reduction of the weight and capacity of power supply units is of prime importance.

The amplitude characteristic of the indicator is illustrated in Fig. 3. Below a certain threshold value, the neon tube does not operate so that, for a given frequency, the average energy is a function of the amplitude of the applied impulses. Above this value, however, the meter reading is independent of the amplitude of the applied voltage, due to the limiting action of the neon tube. The peak in the curve just preceding this constant condition is due to the fact that the constant voltage is less than the initial break-down voltage. The decreasing slope of the curve depends upon the time constant of the circuit, as explained above, and is due to the fact that the 80 volt peak may cause a slightly greater charging current to flow for a brief instant.

A modification of my invention is shown in Fig. 4. In this embodiment, the transformer coupling has been replaced by a resistance-capacitance network in the well known manner. Likewise, the thermionic type rectifier has been replaced by a contact type such as the copper-oxide rectifier 35. The shunting rectifier of Fig. 1 has been replaced by a resistor 33. The biasing battery 29 is no longer necessary. This arrangement requires absolutely no external power source, and consists of a minimum of parts. The purpose of resistor 31 is to decrease the power consumption required to operate the device, that is, to reduce the load on the output tube 37. This, of course, raises the time constant of the circuit, but as indicated above, this may be done within the limits described without affecting the meter reading.

Since the meter responds only to impulses of one polarity, a resistor 33 may be utilized to provide a path for the charging current of the other polarity. This, of course, also tends to increase the time constant for impulses of one polarity, and should not be so large that it interferes with the complete charging or discharging of the capacitor, nor yet so small that it reduces the current through the meter. It is evident that the transformer coupling system shown in Fig. 1 may be used in the embodiment shown in Fig. 4.

It was pointed out above that the total charging current was dependent on the value C of capacitor 15. This provides a convenient method of adjusting the range of the instrument. By selecting the proper capacitor a given meter deflection can be made to correspond to any desired frequency.

I have thus described a frequency indicator which provides a linear indication of frequency, which is independent of the wave shape or amplitude of the voltage to be measured, and which is small, economical and light.

I claim as my invention:

1. In a device of the character described, input means for connection to a source of voltage whose frequency is to be measured, a gaseous discharge device having a pair of similar electrodes, means for connecting said electrodes to said input means, the amplitude of said voltage being limited to a constant value by the discharge between said electrodes, a capacitor, a rectifier and a meter serially connected in shunt with said source, said meter indicating the average amplitude of currents charging said capacitor, and means for discharging said capacitor.

2. In a device of the character described, input means for connection to a source of alternating voltage whose frequency is to be measured, a voltage limiting device connected across said input means, a capacitor, a rectifier and an indicator serially connected across said input means, said capacitor being charged by said voltage, and said indicator measuring the average charging current of said capacitor, and means for discharging said capacitor.

3. In a device of the character described, input means for connection to a source of alternating voltage whose frequency is to be measured, a two electrode, gaseous discharge voltage limiter connected across said input means, a capacitor, a first rectifier and a direct current meter serially connected across said input means, said rectifier being adapted to pass current in one direction through said meter, and a second rectifier connected in shunt across said first rectifier and meter adapted to pass current in the other direction.

4. In a device of the character described, input means for connection to a source of alternating voltage whose frequency is to be measured, a voltage limiting device connected across said input means, a capacitor, a rectifier and an indicator serially connected across said input means, said capacitor being charged by said voltage through said indicator to measure the average charging current of said capacitor, and an impedance connected across said rectifier and indicator for discharging said capacitor.

ROYDEN C. SANDERS, Jr.